Patented Oct. 5, 1937

2,094,775

UNITED STATES PATENT OFFICE 2,094,775

DUST FILTER

Howard Edwin Bedford, Sutton, England, assignor to Pyrene Manufacturing Company, Newark, N. J., a corporation of Delaware Application February 21, 1936, Serial No. 65,017
In Great Britain March 4, 1935

1 Claim. (Cl. 183—67)

This invention relates to filters for separating dust from gases and, although it may be employed to advantage in the purifying of air in factories and so forth, it is particularly adapted for use in connection with rock drills as will hereinafter more clearly appear.

According to the present invention, the dust-laden gas is discharged into a casing in which there is filter material, preferably in the form of a number of cells arranged around an air and dust delivery tube, the dust being retained on the outside of these cells and the air escaping through the interiors of them. With apparatus of this kind it is important to prevent the filter material being directly struck by heavy dust particles as these may leave the delivery tube because these may easily damage the filter material. Moreover, in rock drilling, the dust-laden air usually carries with it substantial quantities of moisture which should also be prevented as far as possible from coming into contact with the filter material. Accordingly, means are provided for precipitating the heavy dust particles and any liquid from the gas stream in the casing before that stream reaches the filter material. These means preferably take the form of a long delivery tube which projects into the container parallel to the filter material at least as far as the end thereof, and of a baffle placed so that the gas stream emerging from the tube strikes it. The heavy particles are thrown out of the stream by this baffle, and the gas after leaving the tube is forced to turn backwards before it can encounter the filter material.

Figure 1:
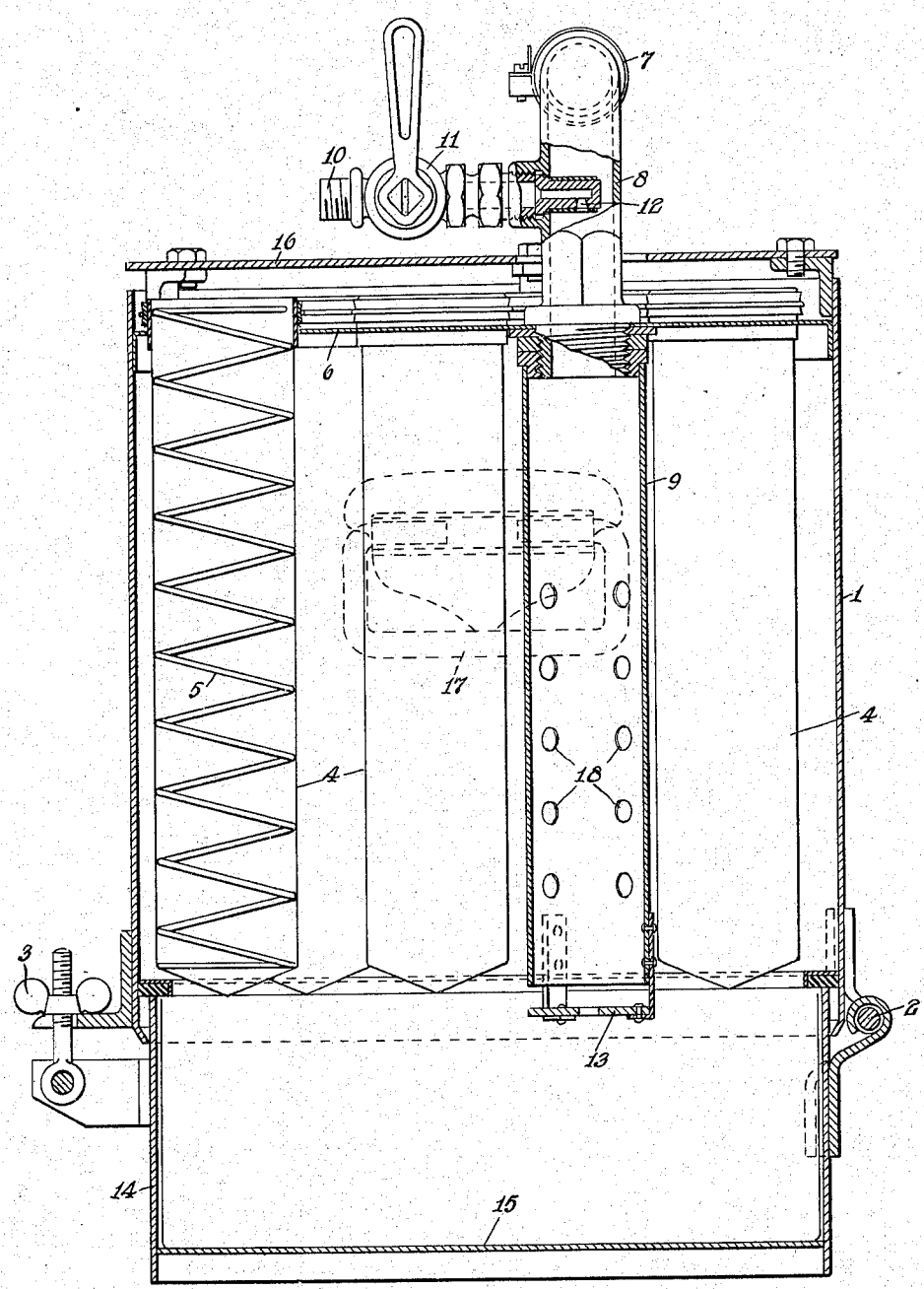
Figure 2:
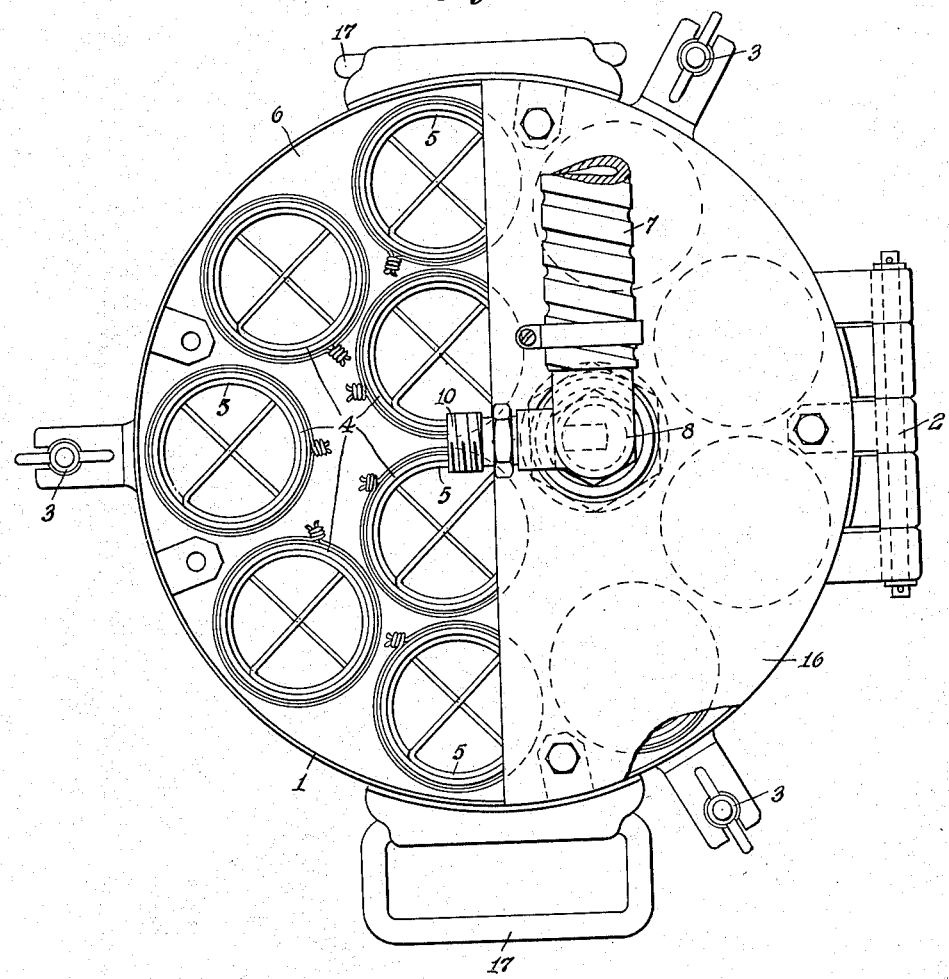

In order that the invention may be clearly understood and readily carried into effect, one filter in accordance therewith will now be described by way of example with reference to the accompanying drawings, in which Figure 1 shows a central vertical section through the filter; and Figure 2 shows a plan of the filter, only half of the cover plate being shown.

The filter consists of a casing 1, made in two parts which are hinged together at 2 and are capable of being locked together by wing nuts 3. Within the upper part of the casing, there is a number of filter cells 4, each consisting of a fabric bag and open at the top and prevented from collapse by spring-like coils 5. These cells 4 are fixed at the top in openings formed in a plate 6 which closes the top of the casing 1 and which is also formed with an opening through which dust-laden air is delivered. The filter shown is intended for use in mines and quarries, and may advantageously be used in cooperation with a dust trap of the kind described and claimed in application Serial No. 58,043. The dust-laden air from the rock drill passes through a hose 7 to a pipe 8, which projects up from the plate 6 and to which there is connected an air and dust delivery tube 9. Compressed air is delivered through a pipe 10, controlled by a valve 11, to a nozzle 12 within the pipe 8, this nozzle constituting an injector which exerts suction on the dust-laden air and delivers it down the tube 9.

Some of the fine dust may escape from the tube 9 through holes 18, but the heavier dust particles and any water that is carried along with the air strike a baffle 13, suspended beneath the end of the tube 9 in a plane below the ends of the filter cells 4. As a result the heavy dust and the water are precipitated from the air stream, which changes its direction of flow and passes out of the filter through the filter cells 4. The fine dust is deposited on the walls of the filter cells, whereas the heavier dust particles are collected within a removable dish-shaped paper bag 15 located within the lower part of the casing.

Whenever necessary the top part of the casing containing the filter cells, the delivery tube 9 and the baffle 13 can be swung away from the bottom part about the hinge 2 and the dust can be removed in the paper bag, a fresh bag being inserted. When it is desired to replace the filter cells 4, a top cover 16 may be removed to give access to these cells. The cover 16 is spaced away from the top of the casing 1 so as to allow the filtered air to escape.

The complete filter is provided with handles 17 by which it can be picked up and readily carried about.

Although only one form of the invention is herein shown and described, it will be understood that various changes may be made without departing from the spirit of the invention or the scope of the following claim.

What is claimed is:

A filter for separating dust from gases comprising a casing including upper and lower parts separably connected together and disposed in an end-to-end relation, a plate disposed within the upper end of the upper part of the casing and having a plurality of openings formed therein, a plurality of bag-like filter cells depending from said plate and having their upper ends open and their lower ends closed, the open ends of said cells being disposed within said openings and the lower ends of said cells being disposed in the vicinity of the plane of juncture of said upper and lower parts of said casing, spring means disposed within each of said cells for retaining it against collapsing, an air and dust delivery tube depending from said plate and having a discharge end disposed in the vicinity of the plane of juncture of said upper and lower parts of said casing, a baffle carried by said tube and disposed beneath the discharge end thereof, a cover spaced from said plate and from the upper end of said casing and from the upper ends of said cells, the space afforded by such spacing serving as a direct path of communication between the exterior of said casing and the open ends of said cells, and means for facilitating the passage of a dust-laden gas into said casing by way of said delivery tube and for facilitating delivery of such gas, after dust removal, from said casing to the exterior thereof by way of said cells and said path of communication.

HOWARD EDWIN BEDFORD.